(12) United States Patent
Nakamura et al.

(10) Patent No.: US 6,568,962 B2
(45) Date of Patent: May 27, 2003

(54) BATTERY CONNECTOR STRUCTURE INCLUDING A POSITIONING PLATE WITH PROJECTION FOR IMPROVED ELECTRICAL CONTACT RELIABILITY

(75) Inventors: Fusanobu Nakamura, Kanagawa-ken (JP); Fumio Tamura, Yamato (JP); Mitsuo Horiuchi, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/952,441

(22) Filed: Sep. 14, 2001

(65) Prior Publication Data

US 2002/0064973 A1 May 30, 2002

(30) Foreign Application Priority Data

Sep. 14, 2000 (JP) .................................... 2000-280000

(51) Int. Cl.[7] .............................................. H01R 24/00
(52) U.S. Cl. .................... 439/660; 439/347; 439/680; 320/107
(58) Field of Search ................................ 439/660, 680, 439/374, 377, 378; 320/107

(56) References Cited

U.S. PATENT DOCUMENTS

| 5,830,018 A | * | 11/1998 | Simmel | 439/660 |
| 5,904,597 A | * | 5/1999 | Doi et al. | 439/660 |
| 6,086,403 A | * | 7/2000 | Po et al. | 439/374 |

* cited by examiner

*Primary Examiner*—P. Austin Bradley
*Assistant Examiner*—Truc Nguyen

(57) ABSTRACT

A battery connector structure and a battery pack are described in which good electrical contact can be maintained even if an external force is applied around the connectors. The battery connector structure includes a male connector that consists of comb-shaped electrodes with a positioning plate, and a female connector having slits into which the comb-shaped electrodes and the positioning plate are inserted to make electrical connections with the comb-shaped electrodes in such a way that the connectors can be connected and disconnected. A projection is provided at the end of the positioning plate and a hollow that accepts the projection is provided in the slit of the female connector or in a system in which the female connector is provided. In addition, the battery pack has this battery connector structure.

11 Claims, 6 Drawing Sheets

BATTERY CONNECTOR STRUCTURE INCLUDING A POSITIONING PLATE WITH PROJECTION FOR IMPROVED ELECTRICAL CONTACT RELIABILITY

BACKGROUND OF THE INVENTION

The present invention relates to a battery connector structure and a battery pack that employ comb-shaped electrodes for use in installing a battery on, for example, a PC (personal computer).

Conventionally, a variety of battery connector structures that employ comb-shaped electrodes for use in installing a battery on a PC are known. A comb-shaped battery connector generally allows for a longer vertical mating length and can be expected to be highly reliable. FIG. 6 shows an example of a battery connector structure that employs conventional comb-shaped electrodes. In the example shown in FIG. 6, a battery connector structure 51 comprises a male connector 53 mounted on a card 52 of a PC body and a female connector 55 mounted on a battery 54.

The male connector 53 then includes comb-shaped electrodes 57 made of metal, for example, with a positioning plate 56 made of plastic, for example. The female connector 55 has slits 58, 59 into which the comb-shaped electrodes 57 and the positioning plate 56 are inserted. The slits 58 are configured to come into contact with the comb-shaped electrodes 57 to make electrical connections with them. The positioning plate 56 is provided to absorb any mechanical shock that may be applied to the comb-shaped electrodes 57 made of metal if any external force such as shock is applied to this battery connector structure 51, thereby preventing the contact from being lost.

The conventional battery connector structure 51 shown in FIG. 6 offers sufficient performance when it is used to install a battery for an ordinary PC or a notebook PC. If the conventional battery connector structure 51 is to be applied to a low-profile notebook PC that is highly demanded in recent years, however, a mating length has to be shortened. Since a housing is thin and easily bent by an applied external force such as shock, the contact may be lost in carrying the PC. In particular, the contact may be lost due to any dislocation in a direction parallel to an electrode surface of the comb-shaped electrodes 57 which results in disengagement, causing the notebook PC to be shutdown in the extreme case.

It is an object of the present invention is to provide a battery connector structure and a battery pack which solve the above-mentioned problem and in which good contact can be maintained even if any external force is applied around the connectors.

SUMMARY OF THE INVENTION

The present invention relates to a battery connector structure, including: a male connector having comb-shaped electrodes with a positioning plate; and a female connector having slits into which the comb-shaped electrodes and the positioning plate are inserted to make electrical connections with the comb-shaped electrodes in such a way that the connectors can be connected and disconnected. In this battery connector structure, a projection is provided at the end of the positioning plate and a hollow that accepts the projection is provided in the slit of the female connector. In this arrangement, any dislocation in a direction parallel to an electrode surface of the comb-shaped electrode can be prevented by mating the projection at the end of the positioning plate with the hollow in the slit. Thus, good contact can be maintained even if any external force is applied around the connectors.

According to a preferred embodiment of the present invention, the arrangement of the connectors may be such that the male connector is on the PC side and the female connector is on the battery side. The positioning plate having the projection may be provided at an asymmetrical position with respect to an electrode array of the comb-shaped electrodes. Preferably, good contact can be further maintained in any case.

In addition, a battery pack of the present invention has a female connector having slits into which the comb-shaped electrodes and positioning plate of a male connector are inserted and a hollow that accommodates a projection of the positioning plate. The hollow may be either formed in the body of the battery pack or in the slit of the female connector. This battery pack has the above-mentioned battery connector structure so that it can maintain as good contact as in the battery connector structure.

DESCRIPTION OF THE ILLUSTRATIVE EMBODIMENTS

Figure 1:
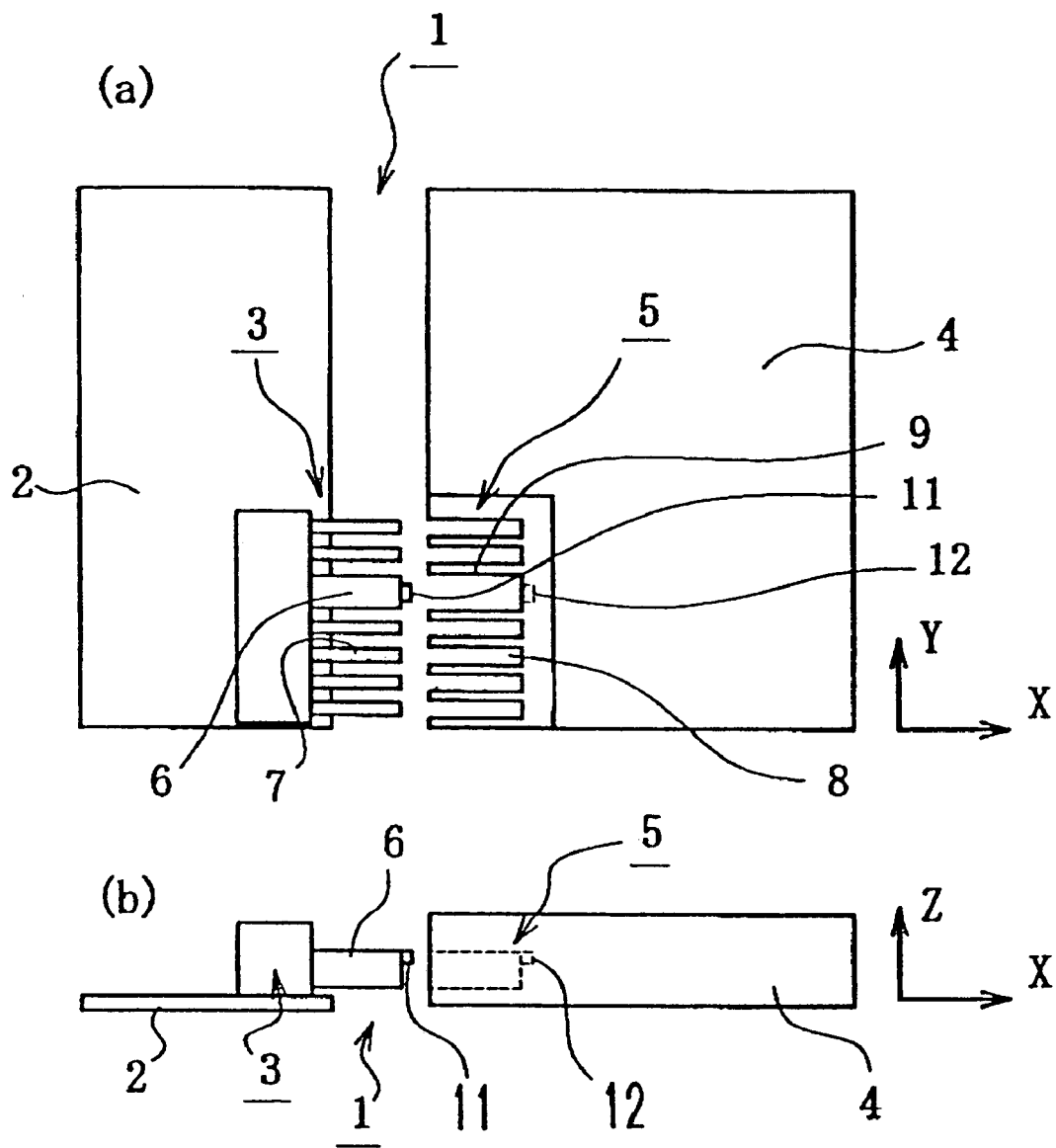
FIGS. 1A and 1B are conceptual views illustrating an example of a battery connector structure of the present invention, respectively.

FIGS. 1A and 1B are conceptual views illustrating an example of a battery connector structure of the present invention, respectively. FIG. 1A shows a plan view (in an X–Y direction) and FIG. 1B shows a front view (in a Z–X direction). In FIGS. 1A and 1B, a battery connector structure 1 of the present invention comprises a male connector 3 mounted on and electrically connected to a card 2 of a PC body and a female connector 5 mounted on and electrically connected to a battery 4. The male connector 3 then comprises comb-shaped electrodes 7 made of metal, for example, with a positioning plate 6 made of plastic, for example. The female connector 5 has slits 8, 9 into which the comb-shaped electrodes 7 and the positioning plate 6 are inserted. The slits 8 are configured to come into contact with the comb-shaped electrodes 7 to make electrical connections with them. The above arrangement has the same structure as that of the conventional example.

The battery connector structure 1 of the present invention is characterized in that a projection 11 is provided at the end of the positioning plate 6 and a hollow 12 that accepts the projection 11 is provided in the slit 9 in the female connector 5. The projection 11 may be of any size that is smaller than the size of the end of the positioning plate 6. In addition, the positioning plate 6 is preferably located at an asymmetrical position with respect to an electrode array of the comb-shaped electrodes 7 for the purpose of preventing misinstalling, as is known conventionally. The hollow 12 that accommodates the projection 11 of the positioning plate 6 when in connection may also be provided on the battery 4 side.

In the battery connector structure 1 of the present invention as described above, the projection 11 at the end of the positioning plate 6 can fit into the hollow 12 in the slit 9 when the male connector 3 and the female connector 5 are connected. Thus, any movement in a Z-direction in the figure is inhibited. With this configuration, the connector will not pull out in the Z direction as long as it is fixed in an X direction so that electrical contact is ensured. In addition, a latch may be used to provide fixation in the X direction as is conventional. In addition, the battery connector structure 1 of the present invention achieves the inhibition of any movement in the Z direction as mentioned above simply by employing an existing positioning plate 6 and processing the end of it without any other new member.

Figure 2A:
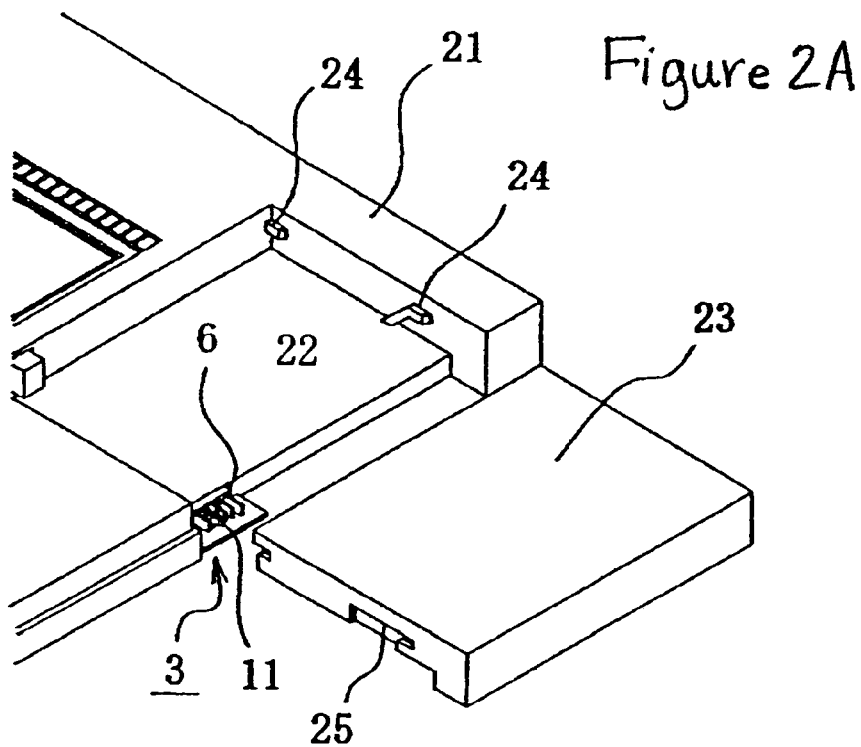
FIGS. 2A and 2B show an example of a battery connector structure of the present invention applied to a notebook PC.
Figure 2B:
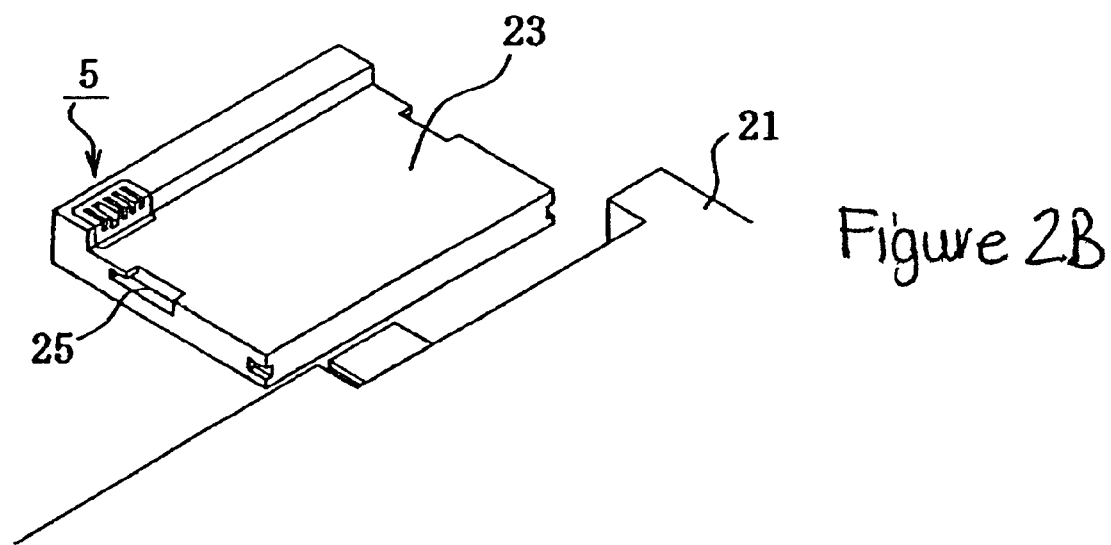

FIGS. 2A and 2B show an example of a battery connector 1 structure of the present invention applied to a notebook PC, respectively. FIG. 2A is a view seen from the front side and FIG. 2B is a view seen from the back side. In the examples shown in FIGS. 2A and 2B, a male connector 3 is provided on the side facing outwardly in a battery-installing portion 22 of a notebook PC 21. A female connector 5 is provided on a corresponding portion when a battery pack 23 is installed on the battery-installing portion 22. A plurality of keys 24 on an inner side of the battery-installing portion 22 are connected with slits 25 on a side of the battery pack 23 to form a latch that provides fixation in the X direction when the battery pack 23 is installed on the battery-installing portion 22.

Figure 3A:
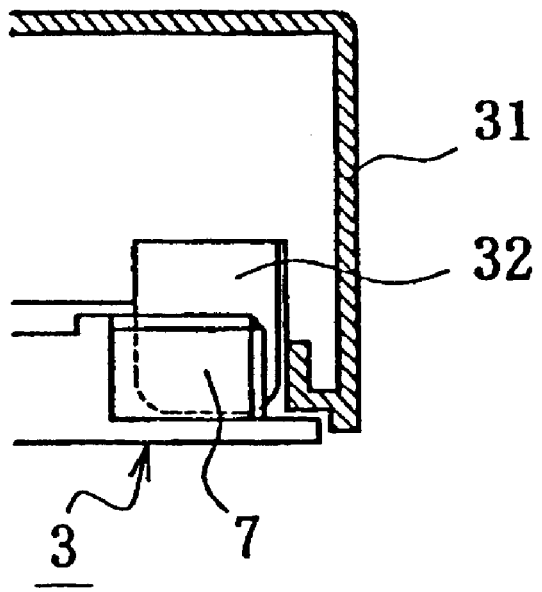
FIGS. 3A and 3B show the states in which comb-shaped electrodes and a positioning plate are installed in a battery connector structure of the present invention, respectively.
Figure 3B:
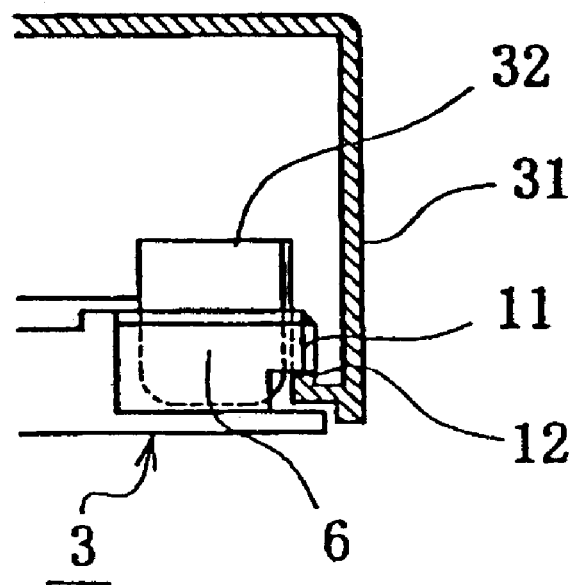

FIGS. 3A and 3B show the states in which comb-shaped electrodes 7 and a positioning plate 6 are installed in a battery connector 1 structure of the present invention, respectively. In FIGS. 3A and 3B, the connector body of a female connector 5 is denoted by 31 and the side of slits 8, 9 in the female connector 5 is denoted by 32. As shown in FIG. 3B, in the present invention, a projection 11 at the end of the positioning plate 6 is longer than the side of the slit 9 and extends on the connector body 31 of the female connector 5 to mate with a hollow 12.

Figure 4A:
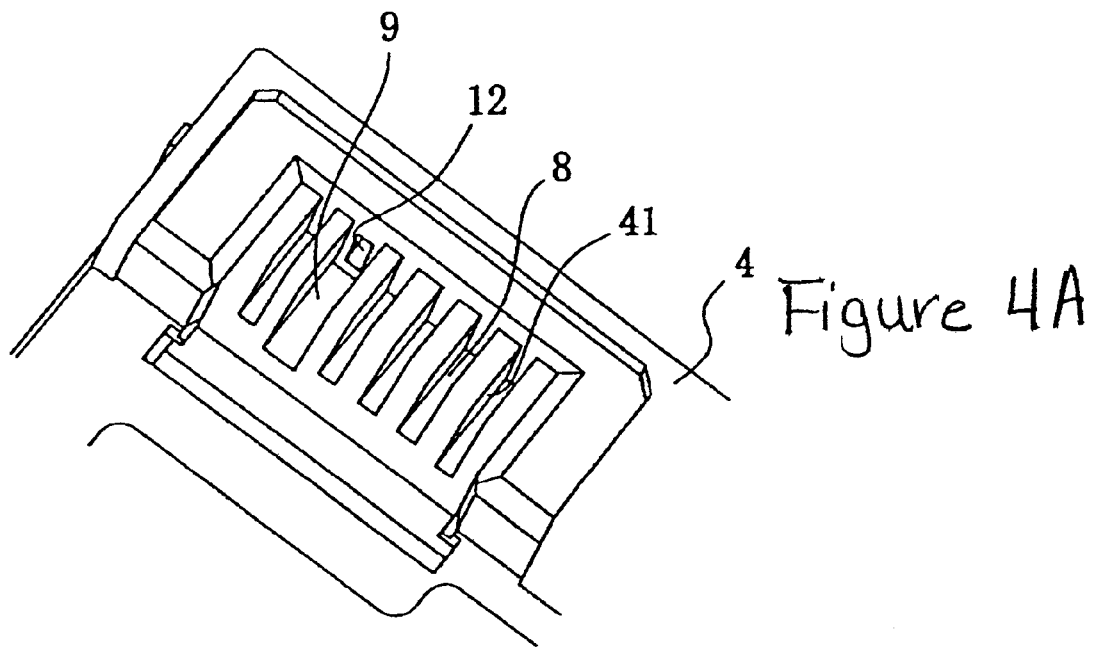
FIGS. 4A and 4B show detailed configurations of a female connector of the present invention.
Figure 4B:
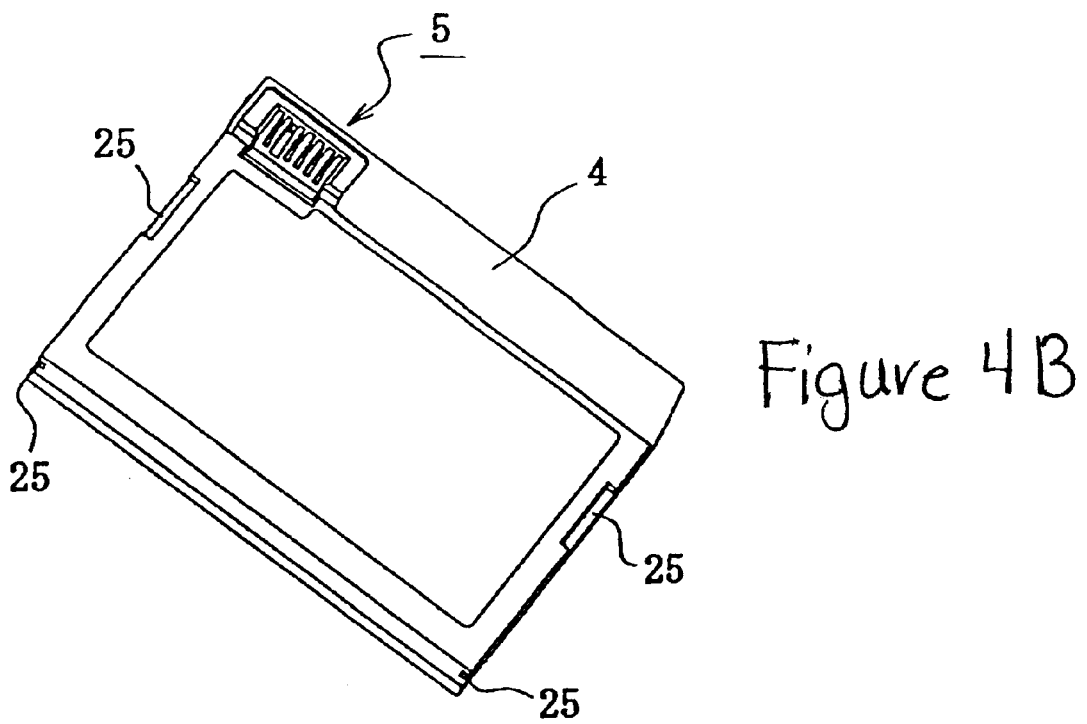

FIGS. 4A and 4B show detailed configurations of the female connector 5, respectively. In the examples shown in FIGS. 4A and 4B, the female connector 5 comprises, at the end of a battery connector 4, side by side, slits 8 for receiving comb-shaped electrodes 7 of a male connector 3 and a slit 9 for receiving a positioning plate 6 of the male connector 3. As shown in FIG. 4A, a hollow 12 for receiving the projection 11 is formed on the side at the back of the slit 9 to receive the positioning plate 6. In addition, electrodes 41 are provided on either side of the slit 8 to make respective electrical connections with the comb-shaped electrode 7.

Figure 5A:
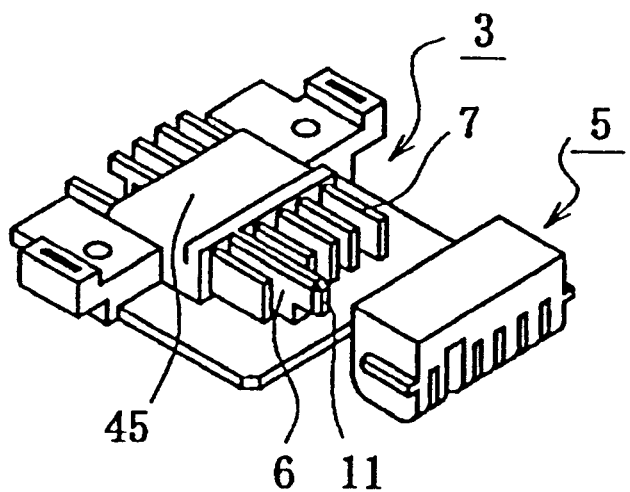
FIGS. 5A to 5C show detailed configurations of a male connector with a female connector.
Figure 5B:
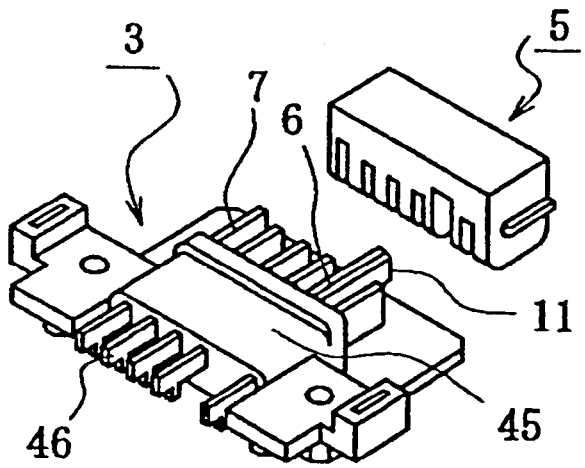
Figure 5C:
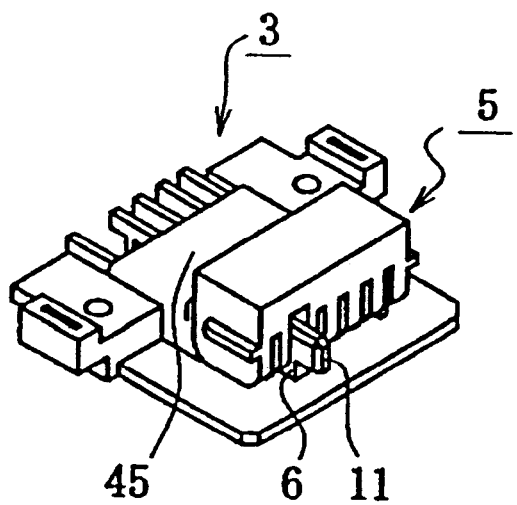
Figure 6:
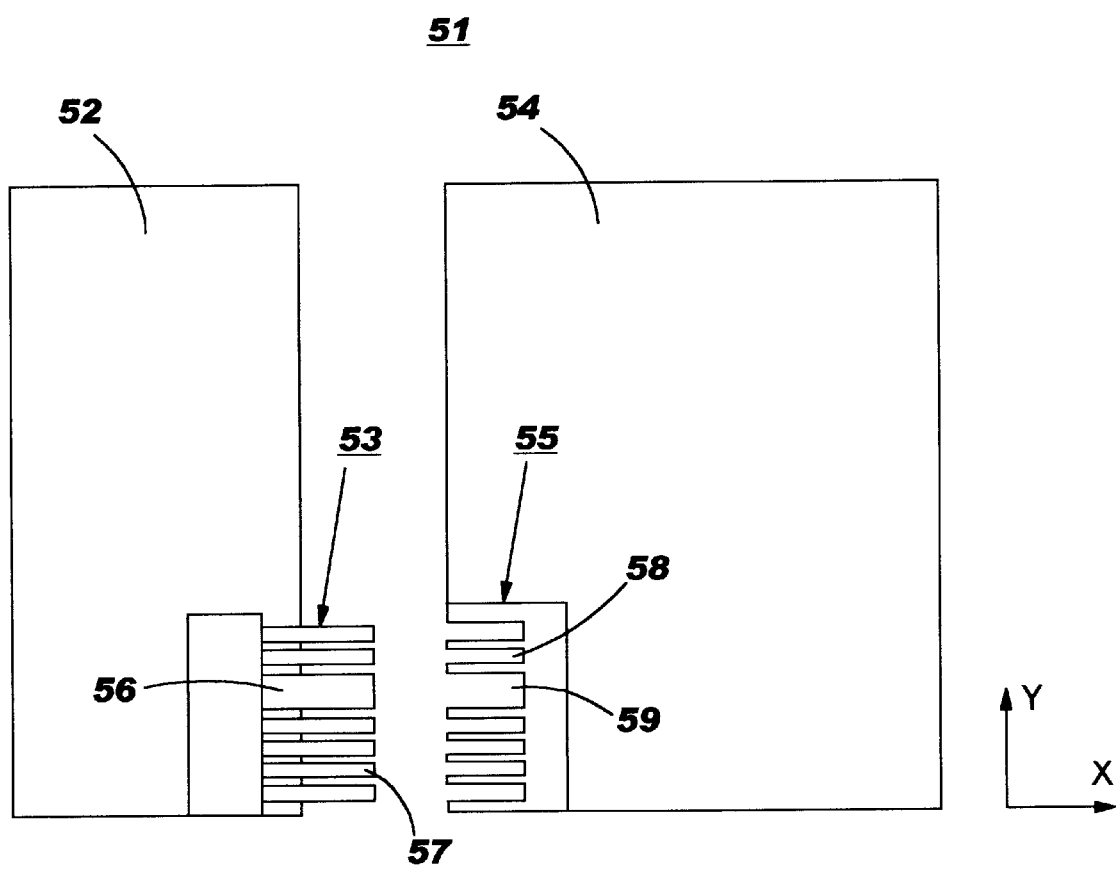
FIG. 6 is a conceptual view illustrating an example of a battery connector structure that employs conventional comb-shaped electrodes.

FIGS. 5A to 5C show detailed configurations of the male connector 3 with the female connector 5, respectively. In this example, a hollow 12 is provided on the body side of a battery pack 23. In the examples shown in FIGS. 5A to 5C, the male connector 3 comprises a plurality of comb-shaped electrodes 7 and a positioning plate 6 side by side fixed on a male connector body 45 and a projection 11 provided on the end of the positioning plate 6. Terminals 46 each for conducting with the plurality of comb-shaped electrodes 7 are provided on the opposite side of the side facing the female connector 5 on which the comb-shaped electrodes 7 and the positioning plate 6 exist. The number of the terminals 46 is the same as that of the comb-shaped electrodes 7. The terminals 46 are used to make electrical connections with the circuitry inside the PC.

As is evident from the above description, the present invention comprises a projection at the end of the positioning plate and a hollow that accepts the projection in the slit of a female connector in such a way that the projection at the end of the positioning plate is connected with the hollow in the slit. Thus, any dislocation in a direction parallel to an electrode surface of comb-shaped electrodes can be prevented so that good contact can be maintained even if any external force is applied around the connectors.

Although the present invention and its advantages have been described in detail, it should be understood that various changes, substitutions and alterations can be made herein without departing from the spirit and scope of the invention as defined by the appended claims.

What is claimed is:

1. Apparatus, comprising:
   a male connector having a first base, a plurality of substantially parallel male electrodes connected at one end to said base, a positioning plate having an attachment end connected to said base, wherein the positioning plate is substantially parallel to said male electrodes, and a projection connected to a free end of said positioning plate, said free end of said positioning plate opposing said attachment end; and
   a female connector having a second base, a plurality of first slits for receiving said plurality of male electrodes and a plurality of female electrodes located in said plurality of first slits for making electrical contact with said plurality of male electrodes when said male connector is coupled to said female connector, a second slit for receiving said positioning plate, said second base including a hole located within said second slit for receiving said projection when said male connector is joined to said female connector, wherein the positioning plate inhibits the movement of said male connector in a first direction relative to said female connector, and the projection inhibits the movement of said male connector in a second direction relative to said female connector.

2. The apparatus of claim 1, further comprising a battery pack coupled to said male connector.

3. The apparatus of claim 1, further comprising a battery pack coupled to said female connector.

4. The apparatus of claim 1, further comprising a computer coupled to said male connector.

5. The apparatus of claim 1, further comprising a computer coupled to said female connector.

6. The apparatus of claim 1, further comprising a computer coupled to said male connector, and a battery pack coupled to said female connector.

7. The apparatus of claim 1, further comprising a computer coupled to said female connector, and a battery pack coupled to said male connector.

8. A battery connector structure for use with a battery pack having a recess for receiving a projection, said battery connector structure comprising:
   a male connector having a first base, a plurality of substantially parallel male electrodes connected at one end to said base, a positioning plate having an attachment end connected to said base, wherein the positioning plate is substantially parallel to said male electrodes, and a projection connected to a free end of said positioning plate, said free end of said positioning plate opposing said attachment end; and a female connector having a second base including first and second opposing surfaces, a plurality of first slits extending from said first surface into said second base for receiving said plurality of male electrodes, a plurality of female electrodes located in said plurality of first slits for making electrical contact with said plurality of male electrodes when said male connector is joined to said female connector, and a second slit in said second base extending from said first opposing surface to said second opposing surface;

wherein the length of said positioning plate as measured between said attachment and free ends is greater than the width of said second base as measured between said first and second opposing surfaces such that, when said male connector is joined to said female connector, said positioning plate extends through said second base of said female connector and extends beyond said second opposing surface, the projection being adapted for insertion into the recess of the battery pack to inhibit the movement of said male connector relative to said female connector.

9. A computer, comprising:

first and second housing portions, said second housing portion being releasably coupled to said first housing portion, said second housing portion having a recess for receiving a projection;

a male connector coupled to said first housing portion and having a first base, a plurality of substantially parallel male electrodes connected at one end to said first base, a positioning plate having an attachment end connected to said first base, the positioning plate being substantially parallel to said male electrodes, and a projection connected to a free end of said positioning plate, said free end of said positioning plate opposing said attachment end; and a female connector coupled to said male connector and to said second housing portion, said female connector having a second base including first and second opposing surfaces, a plurality of first slits extending from said first surface into said second base, a plurality of female electrodes located in said plurality of first slits and in electrical contact with said plurality of male electrodes, and a second slit in said second base extending from said first opposing surface to said second opposing surface;

wherein the length of said positioning plate as measured between said attachment and free ends is greater than the width of said second base as measured between said first and second opposing surfaces, such that said positioning plate extends through said second base and beyond said second opposing surface so that the projection is inserted into the recess of the second housing portion.

10. The computer of claim 9, wherein said first housing portion is a battery pack.

11. The computer of claim 9, wherein said second housing portion is a battery pack.

* * * * *